May 21, 1968 D. J. HARTMAN 3,384,806
POWER CONDITIONING SYSTEM
Filed Oct. 16, 1964 2 Sheets-Sheet 1

SOLAR CELL VOLT AMPERE CHARACTERISTICS AT VARIOUS DISTANCES FROM SUN

INVENTOR.
DAVID J. HARTMAN
BY Roger W. Hansen
ATTORNEY

INVENTOR.
DAVID J. HARTMAN
BY Roger W. Jensen
ATTORNEY

United States Patent Office 3,384,806
Patented May 21, 1968

3,384,806
POWER CONDITIONING SYSTEM
David J. Hartman, Minneapolis, Minn., assignor to Honeywell Inc., a corporation of Delaware
Filed Oct. 16, 1964, Ser. No. 404,281
10 Claims. (Cl. 322—2)

ABSTRACT OF THE DISCLOSURE

An adaptive system for maximum electric power transfer from a source of electric power to an electric load. A switching element is provided between the source and the load and is periodically switched between its conductive and non-conductive states. The ratio of the conductive time to the non-conductive time is controlled as a function of the derivative of the output power with reference to output current to achieve maximum power transfer from the source to the load.

---

The present invention provides an electronic control and power conditioning system for electric power and generating systems. The system here described has been designed for special application with direct energy conversion devices such as fuel cells or solar cells. It is, however, not limited to that application and may find use with any electric power generating system. The unique feature of the control system discussed here is that it provides a continuous optimum impedance match between the generator and its loads. This impedance matching allows maximum efficiency in the conversion of electrical power from the generator to the loads. It gives maximum electrical output for a given energy input.

In the case of solar cells, for example, the energy input cannot be regulated effectively. Large variations may occur as the available solar energy varies with the distance from the sun, or as the solar cells lose their effectiveness with age or are in some way damaged or partially destroyed. The present invention will insure that maximum available power will be extracted from the cells at all times.

An additional advantage is offered in the case of fuel cells or similar generating means, where the amount of fuel or energy input may be closely regulated in correspondence with the power requirements of the loads which vary from time to time. The supply of fuel can thus be conserved at all times when the energy requirements of the loads are low. The maximum power transfer from an energy source, however, occurs at a particular terminal voltage, and operation at a voltage other than this results in a loss of available power due to impedance mismatch. Thus when in prior art systems the energy input into an electrical generator is reduced, some savings in fuel consumption may be made. A larger fraction of the total energy will be lost, however, due to impedance mismatch of the generator and the load as the terminal voltage of the generator decreases. Further savings would be possible if the impedance of the load could always be matched to the impedance of the generator. This is accomplished by the present invention. The outstanding feature of the present invention, therefore, is that it provides for continuous impedance matching between the electrical power generator and the loads it is supplying regardless of changes in either the output impedance of the generator as seen by the loads or in the input impedance of the loads as seen by the generator.

It is an object of the present invention to provide means for efficient transfer of electrical power from the energy source to the energy sink.

A more specific object of the present invention is to provide means for continually matching the output impedance of an electric power generator and the loads the power generator is supplying.

These and further objects of the present invention will become apparent to those skilled in the art upon consideration of the accompanying specification, claims, and drawings of which:

Figure 1:
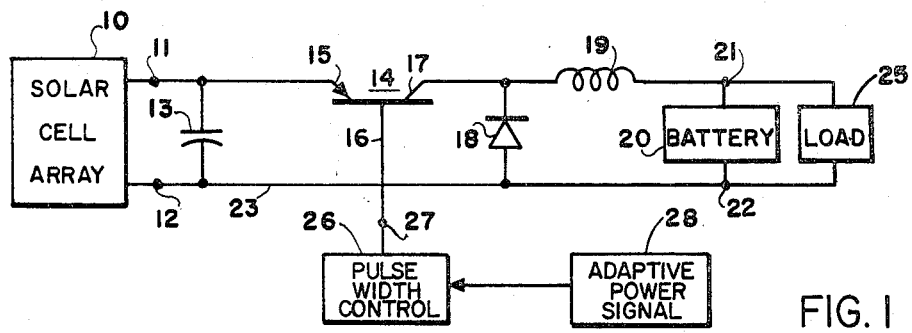
FIGURE 1 is a schematic diagram of an adaptive power conditioning system.

Referring now to FIGURE 1, a solar cell array 10 is shown with output terminals 11 and 12. A capacitor 13 is connected between output terminals 11 and 12 while output terminal 11 is further connected to an emitter electrode 15 of a transistor 14 and output terminal 12 is connected to a conductor 23. Transistor 14 further has a base electrode 16 and a collector electrode 17. A diode 18 is connected between conductor 23 and collector electrode 17, diode 18 being oriented for forward current flow from conductor 23 to collector electrode 17. An inductor 19 is connected between collector electrode 17 and an input terminal 21 of a load network 25. Load network 25 further has an input terminal 22 connected to conductor 23. A battery 20 is connected between terminals 21 and 22. Base electrode 16 of transistor 14 is connected to an output terminal 27 of a pulse width control 26. Pulse width control 26 in turn is connected to receive a control signal from an adaptive power signal network 28.

Figure 3:
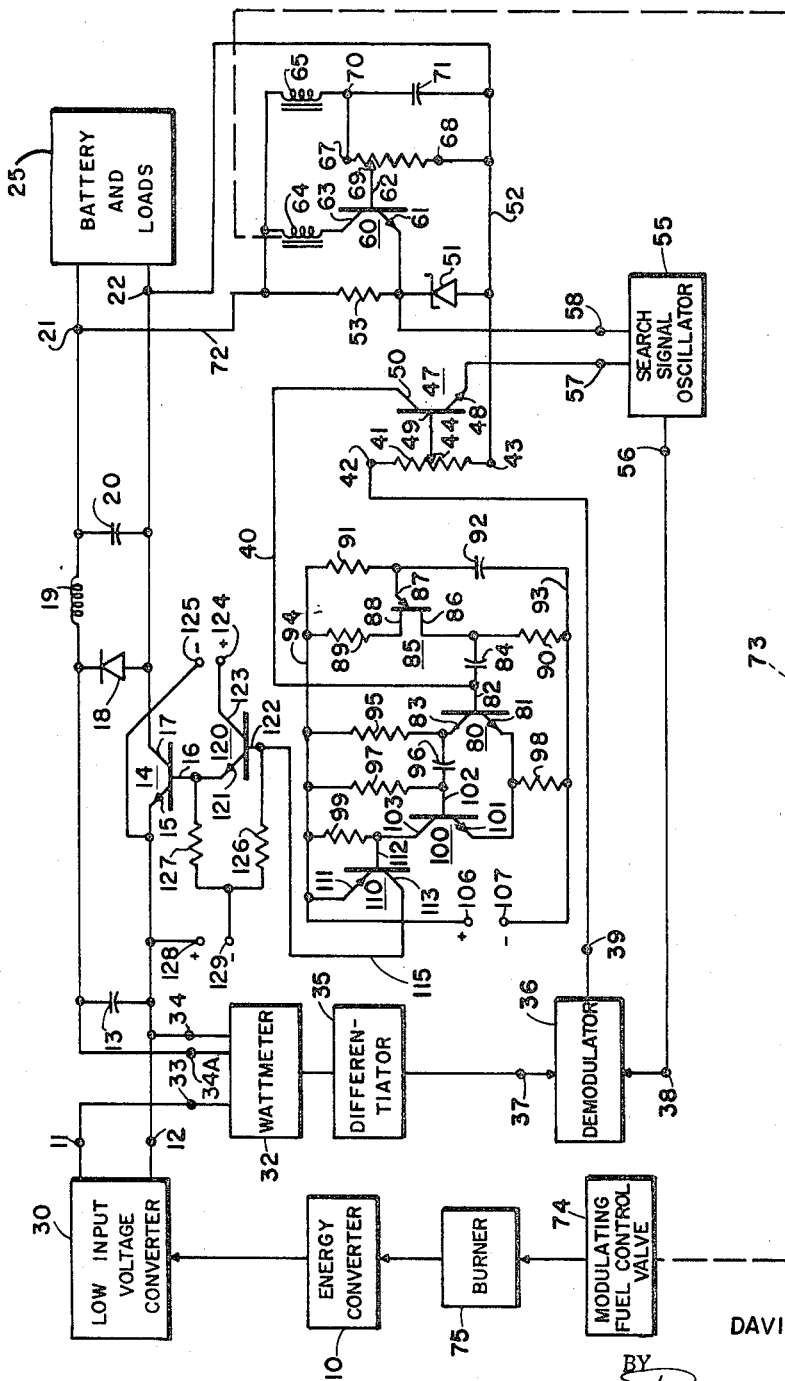
FIGURE 3 is a detailed schematic diagram of one possible embodiment of the adaptive power conditioning system broadly shown in FIGURE 1.

In FIGURE 3 an energy converter 10 corresponding to the solar cell array of FIGURE 1 has its output connected to a low input voltage converter 30. Voltage converter 30 has output terminals 11 and 12. A capacitor 13 is connected between output terminals 11 and 12 of voltage converter 30. Output terminal 12 is connected to an emitter electrode 15 of a transistor 14. Transistor 14 further has a base electrode 16 and a collector electrode 17. Collector electrode 17 of transistor 14 is connected to an input terminal 22 of a load network 25. Load network 25 also has an input terminal 21. A capacitor 20 is connected between input terminals 21 and 22 of load network 25, and an inductor 19 is connected between output terminal 11 of voltage converter 30 and input terminal 21 of load network 25. A diode 18 is connected between collector electrode 17 of transistor 14 and output electrode 11 of voltage converter 30.

A watt meter 32 has input terminals 33, 34 and 34A connected to terminals 11 and 12 respectively. Watt meter 32 has an output connected to a differentiator 35 which in turn has its output connected to an input terminal 37 of a demodulator 36. Demodulator 36 has a second input 38 and an output 39. Demodulator 36 has its input 38 connected to an output terminal 56 of a search signal oscillator 55. Output terminal 39 of demodulator 36 is connected to end terminal 42 of a potentiometer 41. Potentiometer 41 has a second end terminal 43 and a wiper 44. Wiper 44 is connected directly to a base electrode 49 of a transistor 47. Transistor 47 further has an emitter electrode 48 and a collector electrode 50.

Emitter electrode 48 is connected directly to an output terminal 57 of search signal oscillator 55. Search signal oscillator 55 has a second output terminal 58 which is connected to an emitter electrode 61 of a transistor 60.

Transistor 60 also has a base electrode 62 and a collector electrode 63. A Zener diode 51 is connected between emitter electrode 61 and a conductor 52 which is connected directly to input terminal 22 of load network 25 and also to end terminal 43 of potentiometer 41. Emitter 61 is also connected to input terminal 21 of load network 25 through a resistor 53 and a conductor 72. A fuel valve control coil 64 is connected between collector electrode 63 of transistor 60 and conductor 72. Base electrode 62 is connected to a wiper 69 of a potentiometer 66. The potentiometer 66 has one of its terminals 68 connected to conductor 52, and has its other end 67 connected to a junction 70. A capacitor 71 is connected between junction 70 and conductor 52, and an inductor 65 is connected between junction 70 and conductor 72.

Collector electrode 50 of transistor 47 is connected to a base electrode 82 of a transistor 80 by means of a conductor 40. Transistor 80 further has a collector electrode 81 and an emitter electrode 83. Base electrode 82 is connected to a first base 86 of a unijunction transistor 85 through a capacitor 84. Unijunction transistor 85 has a second base electrode 88 and an emitter electrode 87. A resistor 89 is connected between second base electrode 88 and a conductor 94 which is connected directly to a terminal 106. A resistor 91 is connected between emitter electrode 87 and conductor 94 and a capacitor 92 is connected between emitter electrode 87 and a conductor 93, which is connected directly to a terminal 107. A resistor 90 is connected between base electrode 86 and conductor 93.

Emitter electrode 81 of transistor 80 is connected to emitter electrode 101 of a transistor 100 and also to conductor 93 by means of a resistor 98. Transistor 100 has a base electrode 102 and a collector electrode 103. A capacitor 96 is connected between collector electrode 83 of transistor 80 and base electrode 102 of transistor 100, and a resistor 95 is connected between collector electrode 83 and conductor 94. Base electrode 102 of transistor 100 is connected to conductor 94 by means of a resistor 97 and collector electrode 103 is connected to conductor 94 by means of a resistor 99. Collector electrode 103 is also connected directly to a base electrode 112 of a transistor 110. Transistor 110 has an emitter electrode 111 connected directly to conductor 94 and terminal 106, and has a collector electrode 113 connected to a base electrode 122 of a transistor 120 by means of a conductor 115. A biasing potential is applied between terminals 106 and 107, terminal 106 being positive with respect to terminal 107.

Transistor 120 has also a collector electrode 123 and an emitter electrode 121. Collector electrode 123 is connected directly to a terminal 124, while emitter electrode 121 is connected to base electrode 16 of transistor 14. A resistor 126 is connected between base electrode 122 of transistor 120 and a terminal 129 and a resistor 127 is connected between emitter electrode 121 and terminal 129.

Fuel control valve coil 64 is located within a modulating fuel control valve 74. Fuel valve 74 is connected to burner 75 to control the supply of fuel to burner 75. Burner 75 is connected to energy converter, where thermal energy is converted into electrical energy.

*Operation*

FIGURE 1 illustrates a system concept that will accept all the available solar cell power, without regard for its dimensions, and deliver it to a load in useable form. If an energy storage network is placed on the output side of the solar array as well as one on the input to the battery and loads, it is possible to achieve energy transfer between these networks on a bit-by-bit basis with the array and load power being delivered at an essentially continuous level. A circuit for achieving this result is shown in FIGURE 1. Transistor 14 and pulse width control 26 represent a high frequency variable duty cycle switch that couples the energy in capacitor 13 to inductor 19. When the switch is closed, the voltage difference between capacitor 13 and battery 20 is impressed across inductor 19. The current voltage relationship for the inductor is:

$$e_c - E_B = L\frac{di}{dt} \qquad E_B = L\frac{di}{dt} \qquad (1)$$

switch closed    switch open where:
$e_c$ = voltage across capacitor 13
$E_B$ = battery voltage = a constant These relations state that the inductor current must change at a rate proportional to the summation of the circuit voltage sources. If there was a current flowing before the application of the circuit voltage, then that level is the initial value of the inductor current. When the switch opens, the current that was flowing through the inductor will continue and will decay at a rate proportional to the battery voltage as indicated in Equation 1.

The energy transferred from the input of transistor 14 to the output circuit during the switch ON time is equal to the change in energy stored in the capacitor plus the output energy of the solar cell array during this same time period.

Transferred energy per cycle = $½C_1(E_1^2 - E_2^2)$ $$+ Isa\frac{(E_1+E_2)}{2}\Delta t \qquad (2)$$

$E_1$ = Capacitor voltage at beginning of switch ON time
$E_2$ = Capacitor voltage at end of switch ON time
$\Delta t$ = Switch ON time
$Isa$ = Solar array average current This energy enters the output side of the power transfer circuit and is either stored in inductor 19 or delivered to the battery and loads. During the OFF time of the switch, the energy that was stored in inductor 19 is commutated into battery 20 and load 25 through the free wheeling diode 18.

Any energy balance for the ON time portion of a cycle may be written as follows:

$$\frac{C}{2}(E_1^2-E_2^2)+Isa\frac{(E_1+E_2)}{2}\Delta t = \frac{L2}{2}(I_2^2-I_1^2)+\frac{(I_1+I_2)}{2}E_B\Delta t \qquad (3)$$

$I_2$ = Inductor current at end of ON time
$I_1$ = Inductor current at beginning of ON time If the changes in capacitor voltage and inductor current are small compared with their average values, an expansion and simplification may be made based on the relationship $$(a^2 - b^2) = (a+b)(a-b)$$

$$C\overline{E}_c\Delta E_c + IsaE_c\Delta t = L\overline{I}_L\Delta I_L + I_L E_B\Delta t \qquad (4)$$

$\overline{E}_c$ = Average capacitor voltage of $$\text{capacitor } 13 = \frac{E_1+E_2}{2}$$

$\overline{I}_L$ = Average current through $$\text{inductor } 19 = \frac{I_1+I_2}{2}$$

$\Delta E_c$ = Change in voltage of capacitor 13
$\Delta I_L$ = Change in current of inductor 19

Since it has been assumed that the variations in average capacitor voltage and inductor current are small, a new expression involving total cycle time "T" may be introduced. At the input side of the switch, the solar cell array energy input equals the output energy through the switch for a complete cycle.

$$I_{sa}\overline{E}_c T = \overline{I}_L \overline{E}_c \Delta t$$

$$\frac{\Delta t}{T} = \frac{I_{sa}}{\overline{I}_L} \qquad (5)$$

When the array is delivering maximum power, an expression may be written as follows:

$P_{max} = E_B I_L$ (power input equals power output)

and $$\frac{\Delta t}{T} = \frac{I_{sa}(\text{at max. power})}{\frac{P_{max.}}{E_B}} = \frac{I_{sa}(\text{at max. power})E_B}{P_{max.}} \quad (6)$$

The duty cycle of the switch will be a function of the solar cell generator current at its maximum power point times the load voltage divided by the maximum power. One possible mechanization of the pulse width control and adaptive power signal networks is illustrated in FIGURE 3.

The source of electrical energy in FIGURE 1 is a solar cell array. The input energy into a solar cell cannot be easily controlled since it depends upon the available energy from the sun and the problem is only that of extracting the maximum available energy from the solar cells. The present invention, however, has also application in other types of electrical energy converters, such as thermoelectric or thermionic generators, where the energy input, and thereby the energy output, of the energy converter may be controlled. In some cases it becomes desirable, not only to obtain most efficient transfer of electrical energy from the electrical energy converter to the loads, but also to regulate the energy input into the energy converter according to the needs of the load. This type of an arrangement is shown in FIGURE 3.

In FIGURE 3 the output of energy converter 10 is fed into a low input voltage converter 30 for the purpose of stepping up the level of the voltage. The low input voltage conversion circuit may be such as described in the article entitled, "Low Input Voltage Conversion" by J. T. Lingle, printed in 17th Annual Proceedings—Power Sources Conference—May 21, 22, 23, 1963. The energy from the low input voltage converter 30 is transferred to battery and loads 25 in the manner explained with reference to FIGURE 1. Transistor 14 is pulse width modulated to provide a switching rate at which maximum power is transferred from the energy converter to the loads. The logic network for controlling the switching rate of transistor 14 depends on the fact that the output curve of the energy converter and the low input voltage converter is a continuous curve having a positive slope for low values of output current, negative slope for high values of output current and zero slope in the region between, where the output power is at maximum. The output power is differentiated and the logic is designed to seek an operating point in this region of maximum power.

Figure 2:
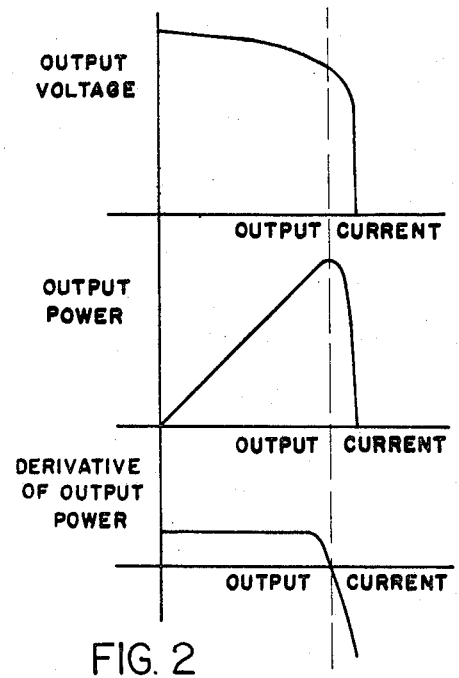
FIGURE 2 represents a set of typical output characteristics of an electric cell.
Figure 4:
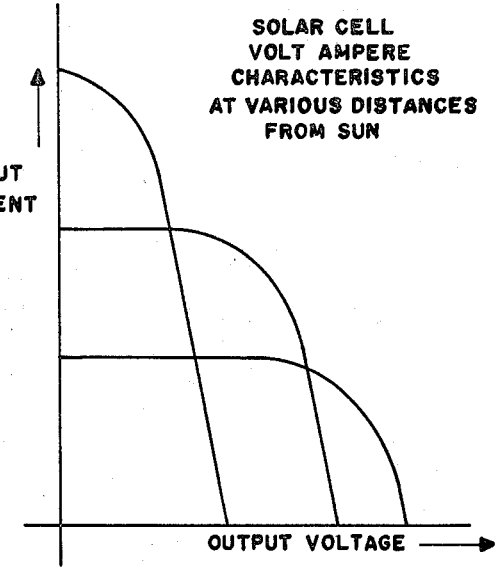
FIGURE 4 represents typical volt-ampere characteristics of a solar cell at various distances from the sun.
Figure 5:
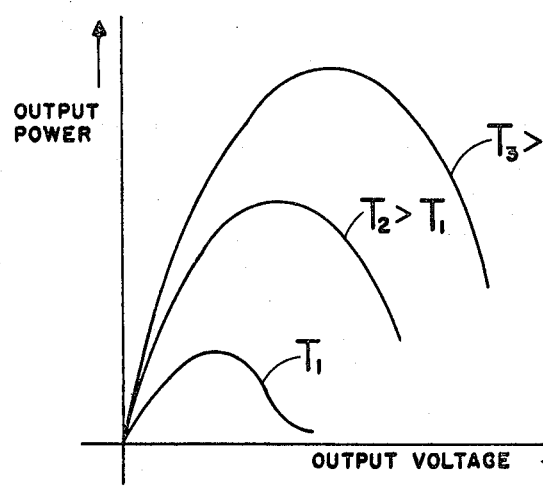
FIGURE 5 represents typical power output characteristics of a thermoelectric generator operating at various temperatures.

A small amplitude "search" signal producing a sinusoidal variation in the operating point, is imposed on the current from energy converter 10 by search signal oscillator 55. This cyclic deviation in operating point is differentiated to obtain the variation in power output versus time. The basis of this technique can be seen in FIGURE 2B, as the peak power output is uniquely defined by the vanishing of the derivative of power output versus current. The phase of the derivative of power output versus current at points other than optimum depend upon the side of the peak power point at which the system is operating. This is illustrated in FIGURE 2C. On the left side, the derivative will be in phase with the search signal, because the power output increases with an increase in output current. On the right side of the peak power point the power output decreases with an increase in current. If this derivative is fed to a demodulator where a phase comparison with the original search signal takes place, an output voltage is obtained whose polarity indicates which direction the operating point must be varied to proceed toward maximum power.

The output power flow from the energy converter 10 and low input voltage converter 30, between terminals 11 and 12, is measured by watt meter 32. The output signal of watt meter 32 is a voltage whose amplitude is proportional to the rate of power flow. This output signal is a DC voltage which is proportional to the actual power on which is superimposed an AC voltage caused by the time variation of the operating point due to the signal from oscillator 55. This voltage fluctuates in accordance with the instantaneous power variations. The signal from watt meter 32 is fed into differentiator 35 where the DC component of the signal is eliminated and the output signal is indicative of the amplitude and sign of the slope of the power curve in the region in which the system is operating. The signal from differentiator 35 is applied at input 37 of demodulator 36 and is demodulated with respect to the search signal from oscillator 55 which is applied at input 38 of the demodulator. The signals from differentiator 35 and oscillator 55 are either in phase, or 180° out of phase, depending on whether the rate of change of power with respect to current is negative or positive. The resultant sum or difference voltage is rectified and averaged to provide a DC voltage whose value is either greater or less than some nominal value dependent upon the sine of DP/DI.

The DC output voltage of demodulator 36 is applied across voltage divider 41. The adjustable wiper 44 on the divider is connected to base 49 of transistor 47, emitter 48 of which is tied to the series-connected voltage reference diode 51 and AC search signal oscillator 55. The resultant current through collector 50 is a direct current that is a function of the demodulator output with a small low frequency AC signal superimposed upon it. This modulated DC voltage is used to control the duty cycle of the transistor switch.

The output signal at collector 50 of transistor 40 is applied to base 82 of transistor 80 in a monostable circuit. Unijunction transistor 85 operates as a relaxation oscillator providing high frequency current pulses to base 82 of transistor 80. Transistors 100 and 110, along with the associated resistors and capacitor 96, form the monostable multivibrator. The pulse from unijunction transistor 85 turns ON transistor 80, which in turn removes the drive power from transistor 100. The ON time of transistor 80 is dependent upon the level of the DC voltage at its base 82, which is determined by the potential of collector 50 of transistor 47. The output signal at collector 103 of transistor 100 is amplified by transistor 110, which in turn provides the rectangular current pulses to base 122 of transistor 120 of the power transfer circuit. The output of transistor 120 is taken at emitter 121 and is applied to base 16 of transistor 14 to affect the switching thereof. It can be seen from this discussion that the ON time of transistor switch 14 is dependent upon the output signal from demodulator 36.

The portion of the system in FIGURE 3 the operation of which has so far been described is sufficient to provide the proper control function for the system of FIGURE 1 where the electrical energy is derived from solar cells. Where, as illustrated in FIGURE 3, the input to the energy converter may be easily regulated, it may be desirable to provide the additional control to vary the energy input into the energy converter according to the requirement of the load. For this reason a second feedback loop is provided in FIGURE 3 from the load to the fuel input to the burner. The usual load of these systems, as shown in FIGURE 3, will include a battery which stores electrical energy during periods of low power usage and delivers this power to periodic loads that exceed the power rating of the generator. In this way the power demand can be averaged, and the size of the generator minimized. If the battery has been discharged, its terminal voltage will be low and the control system will increase the input to burner 75. As the battery charges, its terminal voltage will increase to a predetermined value, at which time a signal is fed back to fuel valve 74 to reduce the temperature of burner 75. The burner temperature will stabilize at whatever value is just sufficient to maintain the battery and supply the fixed loads.

For load systems that do not require a battery, the burner will be controlled by load voltage. The output voltage ripple filtering may be performed by placing a large capacitor in the circuit position normally occupied by the battery. The response of the electrical output to burner fuel flow modulation will be slow because of thermal time delays in the burner assembly. This means that the configuration without a battery will have a poorer response to sudden load disturbances and its application will be limited to situations where this factor is unimportant.

In FIGURE 3 a voltage proportional to the average battery or load voltage between terminals 21 and 22 is compared with that of reference diode 51. When the output voltage reaches the desired value, a current through transistor 60 and coil 64 actuates the modulating fuel control value 74, reducing fuel flow while the adaptive circuit maintains maximum power transfer.

Many variations and embodiments are possible within the spirit of this invention. It is, therefore, understood that the specific embodiment of my invention shown here is for the purpose of illustration only, and that my invention is limited only by the scope of the appended claims.

I claim:

1. An adaptive system for optimum electric power transfer from a source of electric power to an electric load, said system comprising:
   switching means having input means connected to said source of electric power, output means connected to said load, and control means for operating said switching means into a conductive or nonconductive state;
   power sensing means connected to said source of electric power for providing at its output a signal which is a function of the power delivered by said source;
   rate sensitive means connected to output of said power sensing means, said rate sensitive means providing an output signal which is a derivative of the output power with reference to output current; and
   adaptive power control means connected to said rate sensitive means and to said control means of said switching means for alternately operating said switching means into conductive and non-conductive states and to control the ratio of the conductive time to the non-conductive time of said switching means as a function of said signal provided by said rate sensitive means.

2. An adaptive system for optimum electric power transfer from a source of electric power to an electric load, said system comprising:
   a pair of input terminals for connection to the source of electric power;
   a pair of output terminals for connection to the electric load;
   a first electric energy storage means connected between said pair of input terminals;
   a second electric energy storage means connected between said output terminals;
   switching means having input means connected to said input terminals, output means connected to said output terminals and control means adapted to receive a signal for closing or opening an electric power flow path between said source to said load;
   power sensing means connected to a source of electric power for providing at its output a signal which is a function of the power delivered by said source;
   rate sensitive means connected to output of said power sensing means, said rate sensitive means providing an output signal which is a derivative of the output power with reference to output current; and
   adaptive power control means connected to said rate sensitive means and to said control means of said switching means for alternately operating said switching means into said conductive and non-conductive states and to control the ratio of the conductive time to the non-conductive time of said switching means as a function of said signal provided by said rate sensitive means.

3. An adaptive system for optimum electric power transfer from a source of electric power to an electric load, said system comprising:
   a pair of input terminals for connection to the source of electric power;
   a pair of output terminals for connection to the electric load;
   a capacitor electric energy storage means connected between said pair of input terminals;
   a second electric energy storage means connected between said output terminals;
   semiconductor switching means having input means connected to said input terminals, output means connected to said output terminals and control means adapted to receive a signal for operating said switching means into a conductive or nonconductive state by closing or opening an electric power flow path between said input and said output means;
   power sensing means connected to a source of electric power for providing at its output a signal which is a function of the power delivered by said source;
   rate sensitive means connected to output of said power sensing means, said rate sensitive means providing an output signal which is a derivative of the output power with reference to output current; and
   adaptive power control means connected to said rate sensitive means and to said control means of said switching means for alternately operating said switching means into said conductive and non-conductive states and to control the ratio of the conductive time to the non-conductive time of said switching means as a function of said signal provided by said rate sensitive means.

4. An adaptive power system for converting the electric power from an electric energy source to energize a load impedance at optimum efficiency irrespective of changes in the output characteristics of said source or changes in the load impedance, said system comprising:
   an energy conversion means with an electrical output power characteristic whose plot against the output current is a continuous curve having a positive slope for relatively small values of current, a negative slope for relatively large values of current, and at least one maximum point between said positive and said negative slopes, at which point the slope of the curve is zero, said conversion means having a variable input and an output responsive to variations at said input;
   an electric load;
   switching means having input means connected to said coversion means, output means connected to said load and control means adapted to receive a signal for operating said switching means into a conductive or nonconductive state by alternately closing and opening an electric power flow path between said input and said output means;
   a first electric energy storage means connected to said input means of said switching means;
   a second electric energy storage means connected to said output means of said switching means;
   power sensing means connected to a source of electric power for providing at its output a signal which is a function of the power delivered by said source;
   rate sensitive means connected to output of said power sensing means, said rate sensitive means providing an output signal which is a derivative of the output power with reference to output current;
   adaptive power control means connected to said rate sensitive means and to said control means of said switching means for alternately operating said switching means into said conductive and non-conductive states and to control the ratio of the conductive time to the nonconductive time of said switching means as a function of said signal provided by said rate sensitive means; and feedback means connected to said variable input of said energy conversion means for regulating the power output of said energy conversion means.

5. An adaptive power system for converting the electric power from a low voltage cell to energize a load impedance at optimum efficiency irrespective of changes in the output characteristics of said cell or changes in the load impedance, said system comprising:

a low voltage source of electric potential having an output power characteristic whose plot against the output current is a continuous curve having a positive slope for relatively small values of current, a negative slope for relatively large values of current, and at least one maximum point between said positive and said negative slopes, at which point the slope of the curve is zero;

a DC to DC converter adapted to receive at its input the electric power delivered by said source at said low DC voltage and to provide at its output a DC voltage of substantially higher magnitude;

oscillator means energized from said source, said oscillator means providing an alternating electric signal of substantially constant frequency and amplitude;

means for superimposing said alternating signal from said oscillator on the DC signal from said DC to DC converter;

switching means having an input, an output and a control means;

means connecting said input means of said switching means to the output of said DC to DC converter;

electric power measuring means connected to said source and adapted to measure the amount of power delivered by said source and to provide an output signal which is proportional to the amount of delivered power;

differentiating means connected to said power measuring means, said differentiating means providing an output signal which is a derivative of said signal from said power measuring means;

demodulating means connected to receive the signals from said differentiating means and said oscillator means and adapted to provide an output signal which is a function of the slope on the power characteristic curve of said source of electric potential in the region in which said source is operating;

pulse width control means connected to receive at its input the signal from the output of said demodulating means and having its output connected to said control means of said switching means, said pulse width control means being adapted to regulate said switching means into a conductive and a nonconductive condition at regular intervals and to maintain the ratio of the conductive time to the total time such that the input impedance of said switching means, as seen by the power source, allows the power source to operate at maximum efficiency; and electric energy storage means and load impedance means connected to said output means of said switching means to receive the energy from said source of electric energy.

6. An adaptive power system for converting the electric power from a low voltage cell to energize a load impedance at optimum efficiency irrespective of changes in the output characteristics of said cell or changes in the load impedance, said system comprising:

a low voltage source of electric potential;

oscillator means energized from said source, said oscillator means providing an alternating electric signal;

means for superimposing said alternating signal from said oscillator on the signal from said low voltage source;

switching means having an input, an output and a control means;

means connecting said input means of said switching means to said source of electric potential;

electric power measuring means connected to said source and adapted to measure the amount of power delivered by said source and to provide an output signal which is proportional to the amount of delivered power;

differentiating means connected to said power measuring means, said differentiating means providing an output signal which is a derivative of said signal from said power measuring means;

demodulating means connected to receive the signals from said differentiating means and said oscillator means and adapted to provide an output signal which is a function of the slope on the power characteristic curve of said source of electric potential in the region in which said source is operating;

pulse width control means connected to receive at its input the signal from the output of said demodulating means and having its output connected to said control means of said switching means, said pulse width control means being adapted to operate said switching means at a rate which will allow the power source to operate at maximum efficiency; and electric energy storage means and load impedance means connected to said output means of said switching means to receive the energy from said source of electric energy.

7. An adaptive power system for converting the electric power from an electric energy source to energize a load impedance at optimum efficiency irrespective of changes in the output characteristics of said source or changes in the load impedance, said system comprising:

a source of electric energy having an output power characteristic whose plot against the output current is a continuous curve having a positive slope for relatively small values of current, a negative slope for relatively large values of current, and at least one maximum point between said positive and said negative slopes, at which point the slope of the curve is zero;

oscillator means energized from said source, said oscillator means providing an alternating electric signal;

means for superimposing said alternating signal from said oscillator on the DC signal from said source;

switching means having an input means, an output means and a control means;

means connecting said input means of said switching means to said source of electric energy;

electric power measuring means connected to said source and adapted to measure the amount of power delivered by said source and to provide an output signal which is proportional to the amount of delivered power;

differentiating means connected to said power measuring means, said differentiating means providing an output signal which is a derivative of said signal from said power measuring means;

demodulating means connected to receive the signals from said differentiating means and said oscillator means and adapted to provide an output signal which is a function of the slope on the power characteristic curve in the region in which said source is operating;

pulse width control means connected to receive at its input the signal from the output of said demodulating means and having its output connected to said control means of said switching means, said pulse width control means being adapted to operate said switching means at a rate which will allow the power source to operate at maximum efficiency; and electric energy storage means and load impedance means connected to said output means of said switching means to receive the energy from said source of electric energy.

8. An adaptive power system for converting the electric power from an electric energy source to energize a load impedance at optimum efficiency irrespective of changes in the output characteristics of said source or changes in the load impedance, said system comprising:
an energy conversion means with an electrical output, said conversion means having a variable input and an output responsive to variations at said input;
an electric load;
switching means having input means connected to said conversion means, output means connected to said load, and control means adapted to receive a signal for operating said switching means into a conductive or nonconductive state by alternately closing and opening an electric power flow path between said input and said output means;
a first electric energy storage means connected to said input means of said switching means;
a second electric energy storage means connected to said output means of said switching means;
adaptive power signal control means for providing said signal to said control means of said switching means to alternately close and open said power flow path at a rate which will allow optimum power flow from said source to said load, said signal control means including,
  a power measuring means connected to said source for measuring the amount of power delivered by said energy conversion means and to provide an output signal which is a function of delivered power,
  differentiating means connected to receive the output signal from said power measuring means and adapted to provide at its output a signal which is a derivative of said signal from said power measuring means;
  a first signal generating means providing an output signal of substantially constant amplitude and frequency;
  demodulating means connected to receive the signals from said differentiating means and said first signal generating means and adapted to provide an output signal which is a function of the slope on the power characteristic curve in the region in which said energy conversion means is operating,
  signal combining means connected to receive the signals from said demodulating means and said first signal generating means and adapted to provide an output signal which is the signal from said demodulating means modulated by the signal from said first signal generating means,
  pulse width modulating means including a second signal generating means providing a signal of substantially constant frequency and amplitude, the frequency of said second signal generating means being substantially higher than the frequency of said first signal generating means, said modulating means having an input connected to receive the output signal from said signal combining means and having an output connected to said control means of said switching means for operating said switching means at the frequency of said second signal generating means, varying, however, the ratio of the time the switching means is in a conductive state to the total time of each cycle as a function of the signal from said signal combining means; and
feedback means for regulating the power output of said energy conversion means, said feedback means including,
  voltage sensing means, including voltage reference means, connected to said second energy storage means for comparing the average voltage of said second storage means with said reference means and providing an output signal when the voltage of said second storage means reaches or exceeds a predetermined value, and
  input energy control means having an input connected to receive the output signal of said voltage sensing means and having its output connected to the input of said energy conversion means to vary the energy input to said conversion means as a function of the voltage of said second storage means.

9. An adaptive power system for converting the electric power from an electric energy source to energize a load impedance at optimum efficiency irrespective of changes in the output characteristics of said source or changes in the load impedance, said system comprising:
an energy conversion means with an electrical output, said conversion means having a variable input and an output responsive to variations at said input;
an electric load;
switching means having input means connected to said conversion means, output means connected to said load, and control means adapted to receive a signal for operating said switching means into a conductive or nonconductive state by alternately closing and opening an electric power flow path between said input and said output means;
a first electric energy storage means connected to said input means of said switching means;
a second electric energy storage means connected to said output means of said switching means;
adaptive power signal control means for providing said signal to said control means of said switching means to alternately close and open said power flow path at a rate which will allow optimum power flow from said source to said load, said signal control means including,
  a power measuring means connected to said source for measuring the amount of power delivered by said energy conversion means and to provide an output signal which is a function of delivered power,
  differentiating means connected to receive the output signal from said power measuring means and adapted to provide at its output a signal which is a derivative of said signal from said power measuring means;
  a first signal generating means providing an output signal of substantially constant amplitude and frequency;
  demodulating means connected to receive the signals from said differentiating means and said first signal generating means and adapted to provide an output signal which is a function of the slope on the power characteristic curve in the region in which said energy conversion means is operating;
  signal combining means connected to receive the signals from said demodulating means and said first signal generating means and adapted to provide an output signal which is the signal from said demodulating means modulated by the signal from said first signal generating means,
  pulse width modulating means including a second signal generating means providing a signal of substantially constant frequency and amplitude, the frequency of said second signal generating means being substantially higher than the frequency of said first signal generating means, said modulating means having an input connected to receive the output signal from said signal combining means and having an output connected to said control means of said switching means for operating said switching means at the frequency of said second signal generating means, varying, however, the ratio of the time the switching means is in a conductive state to the total time of each cycle as a function of the signal from said signal combining means; and feedback means for regulating the power output of said energy conversion means.

10. An adaptive power system for converting the electric power from an electric energy source to energize a load impedance at optimum efficiency irrespective of changes in the output characteristics of said source or changes in the load impedance, said system comprising:

an energy converson means with an electrical output, said conversion means having a variable input and an output responsive to variations at said input;

an electric load;

switching means having input means connected to said conversion means, output means connected to said load and control means adapted to receive a signal for operating said switching means into a conductive or nonconductive state by alternately closing and opening an electric power flow path between said input and said output means;

a first electric energy storage means connected to said input means of said switching means;

a second electric energy storage means connected to said output means of said switching means; and adaptive power signal control means for providing said signal to said control means of said switching means to alternately close and open said power flow path at a rate which will allow optimum power flow from said source to said load, said signal control means including, a power measuring means connected to said source for measuring the amount of power delivered by said energy conversion means and to provide an output signal which is a function of delivered power, differentiating means connected to receive the output signal from said power measuring means and adapted to provide at its output a signal which is a derivative of said signal from said power measuring means;

a first signal generating means providing an output signal of substantially constant amplitude and frequency;

demodulating means connected to receive the signals from said differentiating means and said oscillator means and adapted to provide an output signal which is a function of the slope on the power characteristic curve in the region in which said energy conversion means is operating, signal combining means connected to receive the signals from said demodulating means and said first signal generating means and adapted to provide an output signal which is the signal from said demodulating means modulated by the signal from said first signal generating means, and pulse width modulating means including a second signal generating means providing a signal of substantially constant frequency and amplitude, the frequency of said second signal generating means being substantially higher than the frequency of said first signal generating means, said modulating means having an input connected to receive the output signal from said signal combining means and having an output connected to said control means of said switching means for operating said switching means at the frequency of said second signal generating means, varying, however, the ratio of the time the switching means is in a conductive state to the total time of each cycle as a function of the signal from said signal combining means.

References Cited

UNITED STATES PATENTS

| | | | |
|---|---|---|---|
| 2,776,382 | 1/1957 | Jensen | 323—22 X |
| 3,046,469 | 7/1962 | Young | 323—22 |
| 3,069,617 | 12/1962 | Mohler | 323—22 |
| 3,098,964 | 7/1963 | Hetzler | 322—28 |
| 3,168,693 | 2/1965 | Eckenfelder | 322—28 |
| 3,214,599 | 10/1965 | Wellford | 322—28 X |

MILTON O. HIRSHFIELD, *Primary Examiner.*

R. V. LUPO, *Assistant Examiner.*